(12) United States Patent
Adachi et al.

(10) Patent No.: US 12,311,303 B2
(45) Date of Patent: May 27, 2025

(54) FILTER STRUCTURE

(71) Applicant: TOYO ALUMINIUM EKCO PRODUCTS CO., LTD., Osaka (JP)

(72) Inventors: Masashi Adachi, Osaka (JP); Takuto Yamagishi, Osaka (JP)

(73) Assignee: TOYO ALUMINIUM EKCO PRODUCTS CO., LTD., Osaka (JP)

( * ) Notice: Subject to any disclaimer, the term of this patent is extended or adjusted under 35 U.S.C. 154(b) by 161 days.

(21) Appl. No.: 17/909,216

(22) PCT Filed: May 14, 2021

(86) PCT No.: PCT/JP2021/018345
§ 371 (c)(1),
(2) Date: Sep. 2, 2022

(87) PCT Pub. No.: WO2021/187628
PCT Pub. Date: Sep. 23, 2021

(65) Prior Publication Data
US 2024/0198264 A1 Jun. 20, 2024

(51) Int. Cl.
*B01D 53/22* (2006.01)
*B01D 39/16* (2006.01)
(Continued)

(52) U.S. Cl.
CPC ....... *B01D 46/0005* (2013.01); *B01D 39/163* (2013.01); *B01D 46/10* (2013.01);
(Continued)

(58) Field of Classification Search
CPC .. B01D 46/0005; B01D 39/163; B01D 46/10; B01D 2239/0478; B01D 2239/0618;
(Continued)

(56) References Cited

U.S. PATENT DOCUMENTS 4,734,447 A * 3/1988 Hattori .................. C09J 153/02
524/505
5,041,482 A * 8/1991 Ornsteen ................ C09J 123/04
524/487
(Continued)

FOREIGN PATENT DOCUMENTS

JP   2002-085927 A   3/2002
JP   2004-114044 A   4/2004
(Continued)

OTHER PUBLICATIONS

International Preliminary Report on Patentability Chapter II, mailed on Mar. 1, 2022 (partial machine translation of PRP 409: Box No. V only).
(Continued)

*Primary Examiner* — Anthony R Shumate
(74) *Attorney, Agent, or Firm* — Rabin & Berdo, P.C.

(57) ABSTRACT

Provided is a filter structure for filtering passing gas by being adhered to an object. The filter structure includes: a filter layer including a sheet-shaped member having air permeability; and an adhesive layer that is formed on at least a part of one surface of the filter layer and is configured to be adhered to the object. The adhesive layer is formed of an acrylic hot-melt adhesive, has a ratio $K_1/K_2$ of a maximum peeling load $K_1$ at 25° C. to a maximum peeling load $K_2$ at 5° C. in a range of 1 to 6, and the filter structure does not separate from the object when adhered to the object under a temperature condition of 25° C. or 5° C.

5 Claims, 3 Drawing Sheets

(51) Int. Cl.
  *B01D 46/00* (2022.01)
  *B01D 46/10* (2006.01)
  *C09J 133/08* (2006.01)
  *F24C 15/20* (2006.01)

(52) U.S. Cl.
  CPC ..... *C09J 133/08* (2013.01); *B01D 2239/0478* (2013.01); *B01D 2239/0618* (2013.01); *B01D 2265/04* (2013.01); *B01D 2279/35* (2013.01); *F24C 15/2035* (2013.01)

(58) Field of Classification Search
  CPC ............. B01D 2265/04; B01D 2279/35; C09J 133/08; F24C 15/2035
  See application file for complete search history.

(56) References Cited

U.S. PATENT DOCUMENTS

| | | | | |
|---|---|---|---|---|
| 5,973,056 | A * | 10/1999 | Ohtsuka | C09J 163/08 524/505 |
| 6,455,168 | B2 * | 9/2002 | Kuno | D21H 21/20 428/486 |
| 2006/0014901 | A1 * | 1/2006 | Hassan | C09J 123/0853 525/191 |
| 2008/0081194 | A1 * | 4/2008 | Yamauchi | C03C 17/3405 65/60.2 |
| 2010/0038365 | A1 * | 2/2010 | Ishida | C08L 53/025 524/476 |
| 2015/0284596 | A1 | 10/2015 | Nakada et al. | |
| 2017/0051187 | A1 | 2/2017 | Ichikawa et al. | |
| 2017/0158917 | A1 * | 6/2017 | Saxberg | C09J 7/385 |
| 2018/0223132 | A1 | 8/2018 | Nakada et al. | |
| 2018/0265753 | A1 * | 9/2018 | Jin | C08L 23/142 |
| 2020/0157326 | A1 * | 5/2020 | Morishita | C08L 23/08 |
| 2023/0049958 | A1 * | 2/2023 | Jeon | C08F 210/16 |
| 2023/0142331 | A1 * | 5/2023 | Nyffeler | A61F 13/0206 602/43 |
| 2024/0198264 | A1 * | 6/2024 | Adachi | B01D 39/08 |

FOREIGN PATENT DOCUMENTS

| | | |
|---|---|---|
| JP | 2015-520774 A | 7/2015 |
| JP | 2016-036801 A | 3/2016 |
| JP | 2017-015297 A | 1/2017 |
| JP | 2018-161598 A | 10/2018 |
| JP | 2019-217493 A | 12/2019 |
| WO | 2015125546 A1 | 8/2015 |

OTHER PUBLICATIONS

International Search Report for PCT/JP2021/018345, mailed on Jul. 20, 2021.

* cited by examiner

FIG. 3

FILTER STRUCTURE

TECHNICAL FIELD

The present invention relates to a filter structure for filtering passing gas by being adhered to an object such as a range hood, an air conditioner, an air purifier, or a vent.

BACKGROUND ART

JP-A-2002-85927 (PTL 1) and JP-A-2017-15297 (PTL 2) disclose filter structures for filtering passing air by being attached to a metal filter or a rectifying plate of a range hood, an air intake port of an air conditioner or an air purifier, an indoor-outdoor vent, or the like. The filter structures described in these documents have a structure in which an adhesive layer is formed on one surface of a sheet-shaped filter layer made of a non-woven fabric or the like. In general, a release sheet having a small thickness is adhered to a surface of the adhesive layer. Further, JP-A-2016-36801 (PTL 3) discloses a filter structure using an acrylic hot-melt adhesive as an adhesive layer.

CITATION LIST

Patent Literature

PTL 1: JP-A-2002-85927
PTL 2: JP-A-2017-15297
PTL 3: JP-A-2016-36801

SUMMARY OF INVENTION

Technical Problem

In order to attach a filter structure as described in PTLS 1 to 3 to an attachment target such as a range hood or an air conditioner, a release film adhered to the surface of the adhesive layer is removed to expose an adhesive surface of the adhesive layer, and then the adhesive surface is aligned with an attachment location and pressure-bonded while the entire filter structure is maintained in an expanded state. Here, in the case in which an acrylic hot-melt adhesive is used as the adhesive layer as in PTL 3, when a filter structure is attached to a metal filter of a range hood at room temperature (25° C.), the filter structure has good adhesiveness, and thus no separation from the metal filter is observed. However, for example, when the filter structure is attached to a metal filter of a range hood installed in a kitchen that has not been used for a long time in a low temperature environment such as winter, the filter structure may separate from the metal filter. It may be not even possible to attach the filter structure to the metal filter. This is because that the adhesiveness of an adhesive in the related art changes significantly between normal temperature and low temperature, and thus when a surface temperature of the metal filter is about 5° C. in the cold season, the adhesiveness significantly decreases due to a temperature decrease of the adhesive per se. On the other hand, by improving the adhesiveness of the acrylic hot-melt adhesive at a low temperature, separation of the filter structure can be prevented in the cold season, but in this case, as a result of improving the adhesiveness of the adhesive at low temperature, when the filter structure is peeled off after being attached to the metal filter and left at room temperature for a long time, there may be a problem that a part of the adhesive remains stuck to the metal filter side (adhesive residue).

Such a problem is more likely to occur as an external size of the filter structure increases. In general, since a filter structure for a range hood or an air conditioner has a relatively large external size of several tens of centimeters in length and width, the above problem is likely to occur.

The invention has been made in view of the above problem in the related art, and an object of the invention is to provide a filter structure that has good attachability under both conditions of normal temperature and low temperature, does not separate from a metal filter, and does not have adhesive residue.

Solution to Problem

In order to achieve the above object, a filter structure according to a first aspect of the invention is a filter structure for filtering passing gas by being adhered to an object. The filter structure includes: a filter layer including a sheet-shaped member having air permeability; and an adhesive layer that is formed on at least a part of one surface of the filter layer and is configured to be adhered to the object. The adhesive layer is formed of an acrylic hot-melt adhesive, has a ratio $K_1/K_2$ of a maximum peeling load $K_1$ at 25° C. to a maximum peeling load $K_2$ at 5° C. in a range of 1 to 6, and the filter structure does not separate from the object when adhered to the object under a temperature condition of 25° C. or 5° C.

With this configuration, even when temperatures at the time of attachment are different temperatures of 25° C. and 5° C., an adhesive force of the adhesive layer formed of an acrylic hot-melt adhesive is changed less than that of a filter structure in the related art, and a stable adhesive force can be obtained. Therefore, the filter structure does not separate from the object under either temperature condition of 25° C. or 5° C.

According to a filter structure according to a second aspect of the invention, in the configuration of the invention according to the first aspect, the adhesive layer has a maximum peeling load $K_1$ at 25° C. in a range of 0.01 N/mm or more and 0.18 N/mm or less and a maximum peeling load $K_2$ at 5° C. in a range of 0.01 N/mm or more and 0.05 N/mm or less.

With this configuration, even under different temperature conditions of 25° C. and 5° C., an appropriate adhesive force to an object such as a metal filter of a range hood can be obtained.

According to a filter structure according to a third aspect of the invention, in the configuration of the invention according to the first or second aspect, a surface of the object is plated with a metal or painted with a resin.

With this configuration, the object to which the filter structure is applied is limited to an object whose surface is plated or coated with a resin.

According to a filter structure according to a fourth aspect of the invention, in the configuration of the invention according to any one of the first to third aspects, an application rate of the adhesive forming the adhesive layer on the one surface of the filter layer is 5% to 95%.

With this configuration, the application rate of the adhesive on the one surface of the filter layer is in a range of 5% to 95%.

According to a filter structure according to a fifth aspect of the invention, in the configuration of the invention according to any one of the first to fourth aspects, at least one length of the filter layer is 25 cm or more.

With this configuration, the filter structure becomes a relatively large product.

According to the filter structure according to the first aspect of the invention, since the adhesive layer is formed of an acrylic hot-melt adhesive, and has a ratio $K_1/K_2$ of the maximum peeling load $K_1$ at 25° C. to the maximum peeling load $K_2$ at 5° C. within a predetermined range, when the filter structure is adhered to an object under either temperature condition of 25° C. or 5° C., the filter structure can be attached to the object with an appropriate adhesive force without separating from the object. In addition, no adhesive residue is generated when the filter structure is peeled off from a metal filter or the like after the filter structure is attached and used for a long time.

According to the filter structure according to the second aspect of the invention, in addition to the effect of the invention according to the first aspect, since the maximum peeling loads $K_1$ and $K_2$ of the adhesive layer under the temperature conditions of 25° C. and 5° C. are set in appropriate ranges, even under different temperature conditions, there is no fear that the filter structure easily separates from the object or partially peels off from the object after the filter structure is adhered to the object, and the filter structure can be easily peeled off from the object without any adhesive residue when replacement is necessary.

According to the filter structure according to the third aspect of the invention, in addition to the effect of the invention according to the first aspect or the second aspect, when the filter structure is applied to an object whose surface is plated or coated with a resin, no adhesive residue is generated or adhesive residue can be reduced when the filter structure is removed from the object after being attached.

According to the filter structure according to the fourth aspect of the invention, in addition to the effect of the invention according to any one of the first to third aspects, since an area ratio of the adhesive layer formed on the one surface of the filter layer is set to a specific range, a balance between the adhesive force of the entire filter structure and the air permeability of the filter layer can be appropriately set according to the object to be adhered.

According to the filter structure according to the fifth aspect of the invention, in addition to the effect of the invention according to any one of the first to fourth aspects, since the object to which the invention is applied is a filter structure having a relatively large external size, which is likely to separate or partially peel off from an object due to its own weight, an advantage becomes more apparent that the filter structure does not separate from the object when the filter structure is adhered to the object under either temperature condition of 25° C. or 5° C.

DESCRIPTION OF EMBODIMENTS

Figure 1:
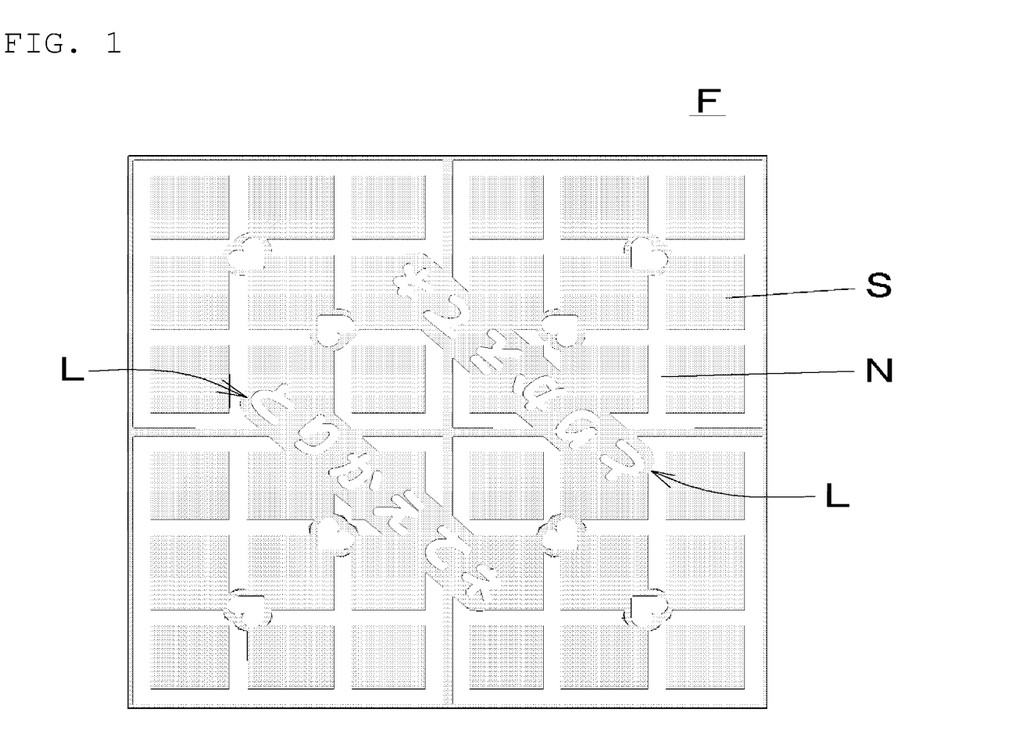
FIG. 1 is a front view showing an example of a filter structure according to an embodiment of the invention.

FIG. 1 is a front view showing an example of a filter structure according to an embodiment of the invention. A filter structure F is a filter structure for filtering passing gas by being adhered to an object, and includes a sheet-shaped filter layer S for filtering passing air, and an adhesive layer N that is formed on at least a part of one surface of the filter layer S and is adhered to the object. The filter structure F of the present example is characterized in that the adhesive layer N is formed of an acrylic hot-melt.

The filter layer S of the present example is made of, for example, a non-woven fabric, a woven fabric, a knitted fabric, or the like. In order to ensure a practical strength while achieving both the collection of dust and the like and the flow of gas, the filter layer S preferably has a thickness set in a range of 0.3 mm to 15.0 mm and a basis weight set in a range of 20 g/m² to 200 g/m². When the thickness is less than 0.3 mm or the basis weight is less than 20 g/m², the practical strength may be insufficient and a sufficient collection function may not be exhibited. When the thickness is more than 15.0 mm or the basis weight is more than 200 g/m², a flow resistance of the gas may increase, and the practicality as an air filter may be impaired. Examples of a material of the filter layer S include, but are not limited to, polyesters such as PET, polypropylene or copolymers mainly composed of propylene, acrylics containing modacrylic, and the like. When the filter structure of the invention is used as a filter structure for a range hood, when the filter layer S is, for example, a non-woven fabric, it is preferable to use flame-retardant fibers as constituent fibers or to treat the fibers with a flame retardant (for example, attach a fatty acid metal salt such as aluminum stearate to the fibers).

The adhesive layer N is formed of an acrylic hot-melt on at least a part of the one surface of the filter layer S. The acrylic hot-melt has properties such as high cohesion, excellent weather resistance and moisture resistance, and little need for a tackifier. The adhesive layer N formed on the filter layer has a property that a ratio $K_1/K_2$ of a maximum peeling load $K_1$ at 25° C. to a maximum peeling load $K_2$ at 5° C. [=maximum peeling load N/mm (25° C.)÷maximum peeling load N/mm (5° C.)] is in a range of 1 to 6. By having such a property, when the filter structure F is adhered to an object under either temperature condition of 25° C. or 5° C., the filter structure F does not separate from the object. The maximum peeling load $K_1$ of the adhesive layer N at 25° C. is preferably in a range of 0.01 N/mm to 0.18 N/mm, and more preferably in a range of 0.05 N/mm to 0.13 N/mm, and the maximum peeling load $K_2$ of the adhesive layer N at 5° C. is preferably in a range of 0.01 N/mm to 0.05 N/mm, and more preferably in a range of 0.02 N/mm to 0.04 N/mm. By setting the adhesive layer N in this manner, it is possible to provide the filter structure F which can reliably prevent the adhesive layer N from separating from an object under either temperature condition of 25° C. or 5° C. and can also solve a problem of adhesive residue at 25° C.

As a method for imparting the above properties to the adhesive layer, various physical properties can be adjusted by adding one or more of the following components to the acrylic hot-melt forming the adhesive layer.

(Tackifier): Improvement of Adhesion of Adhesive Layer to Filter Layer

Tackifier resins such as a rosin-based resin, terpene resin, a (hydrogenated) petroleum resin, coumarone-indene-based resin, a aromatic hydrogenated copolymer, a styrene-based resin, a phenol-based resin, and a xylene resin; plasticizers such as a phthalic acid ester, an adipic acid ester, a sebacic acid ester, other fatty acid esters paraffin, an epoxy-based polymer plasticizer, a phosphoric acid ester, a phosphorous acid ester, an acrylic oligomer, polyisoprene, process oil, naphthenic oil, a polyester polyol, a polyether polyol, and a polyol compound; and ethylene-ethyl acrylate copolymer, ethylene-vinyl acetate copolymer, and other polymers such as polyvinyl acetate, and the like.

(Softening Agent): Prevention of Decrease in Adhesive Force at Low Temperature, Improvement in Coatability (Prevention of Stringing), and Prevention of Adhesive Residue Mineral oils (synthetic oils) such as petroleum-based hydrocarbons, vegetable oils, animal oils, paraffins, terpenoids, fatty acids, fatty acid esters, alcohols, honey, and crotamiton.

The above components may be used alone or in combination of two or more kinds thereof.

Examples of a method for applying the acrylic hot-melt to the filter layer include, but are not limited to, a roller coating method using an application roller, a spray coating method, an inkjet method, a die coating method, a screen printing method, and the like.

Hereinafter, a manufacturing procedure of the filter structure by the roll coating method will be described.

Figure 2:
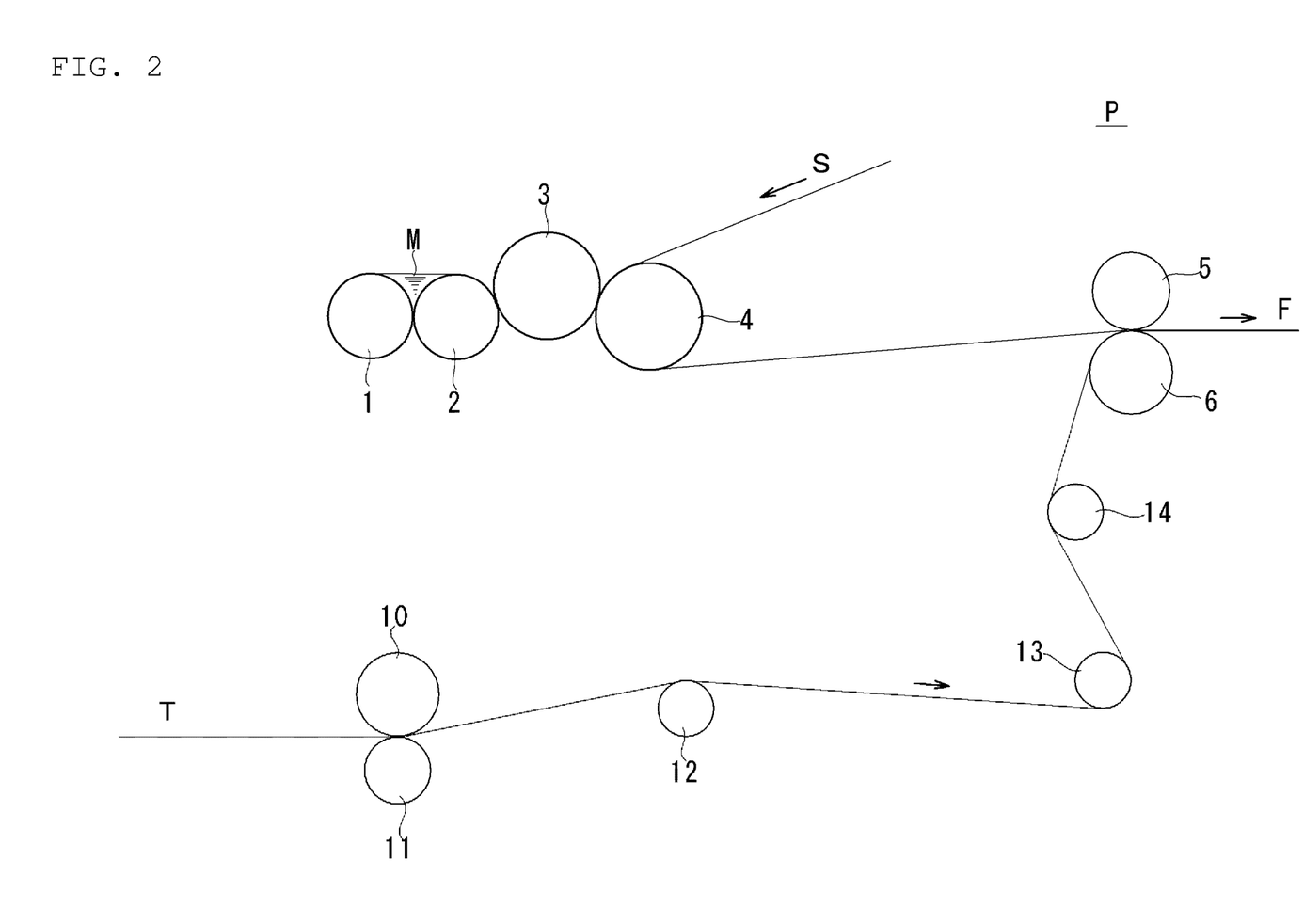
FIG. 2 is a schematic view showing an example of a manufacturing device for manufacturing the filter structure according to the embodiment of the invention.

FIG. 2 is a schematic view showing an example of a manufacturing device for manufacturing the filter structure according to the embodiment of the invention. Referring to FIG. 2, a manufacturing device P includes a unit for supplying an acrylic hot-melt M, a unit for supplying the sheet-shaped filter layer S made of a non-woven fabric or the like, a unit for supplying a release sheet T made from a PET film or the like, a hot-melt supply roller 2 and an auxiliary roller 1 for storing and feeding the acrylic hot-melt M, an application roller 3 and a backup roller 4 for coating the acrylic hot-melt M to the one surface of the filter layer S, nip rollers 5 and 6 for laminating and bonding the filter layer S and the release sheet T, supply rollers 10 and 11 for supplying the release sheet T while adjusting a conveying speed of the release sheet T, and conveying rollers 12, 13, and 14 for conveying the release sheet T. The auxiliary roller 1, the hot-melt supply roller 2, the application roller 3, and the backup roller 4 are arranged adjacent to one another, and are configured to rotate in conjunction with one another. The acrylic hot-melt M in a molten state is stored above an abutting portion between the hot-melt supply roller 2 and the auxiliary roller 1. When the hot-melt supply roller 2 is rotated, the acrylic hot-melt M adhering to a surface of the hot-melt supply roller 2 is transferred to a surface of the application roller 3 in contact with the acrylic hot-melt M. A transfer amount of the acrylic hot-melt M can be controlled by adjusting a size of a gap between the hot-melt supply roller 2 and the auxiliary roller 1. As the application roller 3, a known printing roller such as a gravure roller or a relief roller can be used.

By causing the filter layer S to pass between the application roller 3 to which the acrylic hot-melt M is adhered by the transfer from the hot-melt supply roller 2 and the backup roller 4, desired characters, patterns, and the like can be printed on the one surface of the filter layer S with the acrylic hot-melt M. The filter layer S on which characters and the like are printed is supplied to the nip rollers 5 and 6. The release sheet T made of PET or the like is conveyed to the position of the nip rollers 5 and 6 by the supply rollers 10 and 11 and the conveying rollers 12, 13, and 14. The conveying speed of the release sheet T is adjusted by a rotation speed of the supply rollers 10 and 11, and is controlled so as to coincide with a conveying speed of the filter layer S. The filter layer S and the release sheet T supplied to the nip rollers 5 and 6 are passed between the nip rollers 5 and 6 in a state where the surface of the filter layer S coated with the acrylic hot-melt M and the release sheet T face each other. Thus, the filter structure F in which the filter layer S and the release sheet T are laminated and bonded can be obtained.

Thereafter, the manufactured long filter structure F is cut into a predetermined size as necessary to be commercialized, and is sold as a filter product with a release sheet. At the time of use, the release sheet T is peeled off at a work site, and the filter layer S portion made of a non-woven fabric or the like is adhered to an object using the adhesive layer N.

Figure 3:
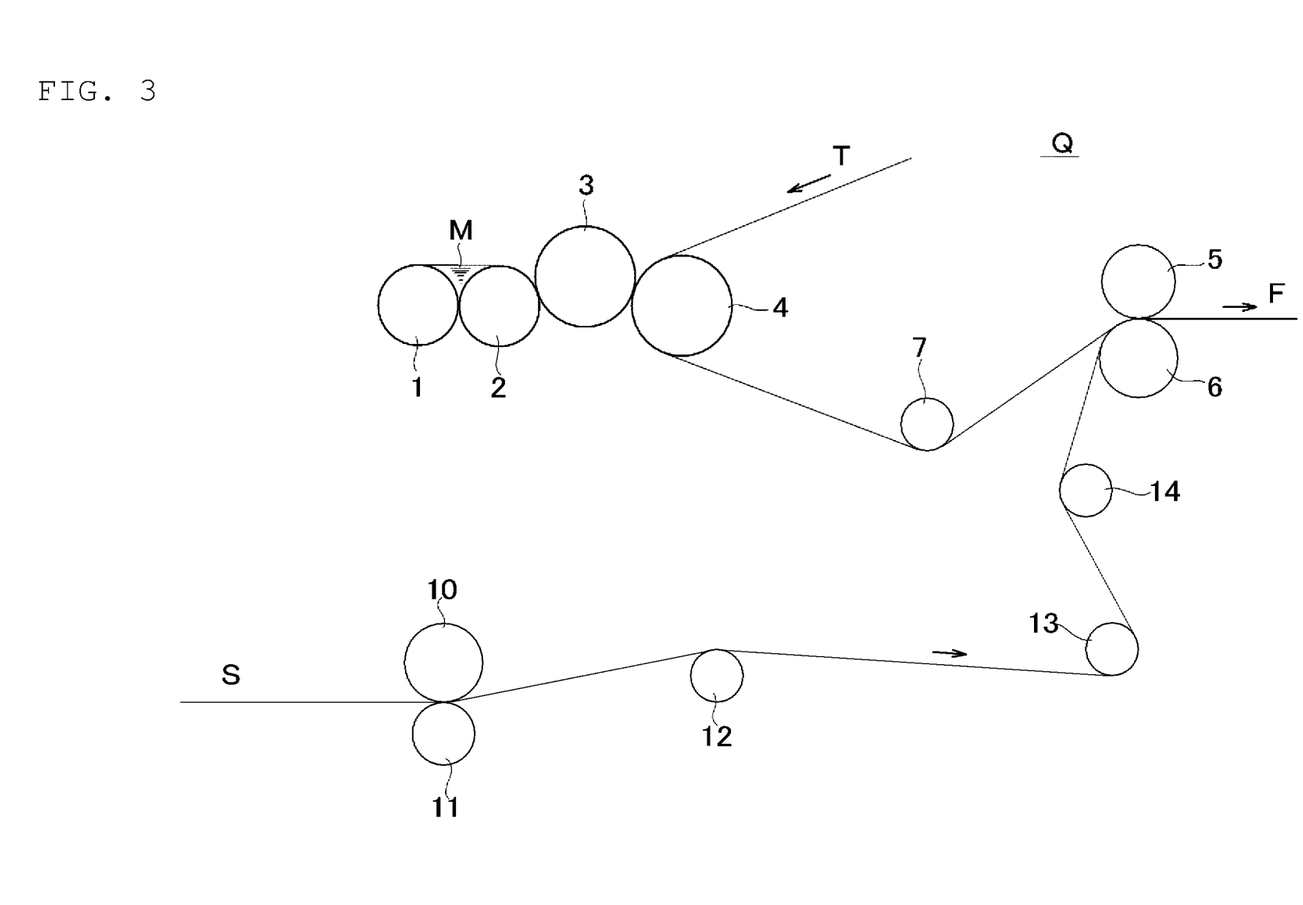
FIG. 3 is a schematic view showing another aspect of the manufacturing device for manufacturing the filter structure according to the embodiment of the invention.

FIG. 3 is a schematic view showing another aspect of the manufacturing device for manufacturing the filter structure according to the embodiment of the invention. Referring to FIG. 3, a manufacturing device Q includes a unit for supplying the filter layer S, a unit for supplying the release sheet T, a unit for supplying the acrylic hot-melt M, an application unit for applying the acrylic hot-melt M to the release sheet T, a press unit for pressing the filter layer S against the adhesive layer, and a hardness adjusting unit for adjusting a hardness of the adhesive layer such that only a part of the adhesive layer enters a gap of the filter layer S. The filter layer S is, for example, a non-woven fabric, and the release sheet T is, for example, a PET film. The unit for supplying the filter layer S includes the supply rollers 10 and 11 for supplying the filter layer S while adjusting the conveying speed of the filter layer S, and the conveying rollers 12, 13, and 14 for conveying the filter layer S. The unit for supplying the acrylic hot-melt M includes the hot-melt supply roller 2 and the auxiliary roller 1 for storing and feeding the acrylic hot-melt M. The application unit includes the application roller 3 and the backup roller 4 for applying the acrylic hot-melt M supplied from the hot-melt supply roller 2 to form the adhesive layer N having a predetermined pattern. The press unit includes the nip rollers 5 and 6 for laminating and pressing the filter layer S on the release sheet T to bond the filter layer S and the release sheet T. The hardness adjusting unit includes a metal roller 7 in contact with a surface of the release sheet T opposite to the surface on which the adhesive layer N is formed. As the unit for supplying the release sheet T, a known mechanism can be used, and illustration thereof is omitted. The auxiliary roller 1, the hot-melt supply roller 2, the application roller 3, and the backup roller 4 are arranged adjacent to one another, and are configured to rotate in conjunction with one another.

The acrylic hot-melt M in a molten state is stored above the abutting portion between the hot-melt supply roller 2 and the auxiliary roller 1. When the hot-melt supply roller 2 is rotated, the acrylic hot-melt M adhering to the surface of the hot-melt supply roller 2 is transferred to the surface of the application roller 3 in contact with the acrylic hot-melt M. The transfer amount of the acrylic hot-melt M can be controlled by adjusting the size of the gap between the hot-melt supply roller 2 and the auxiliary roller 1. As the application roller 3, a known printing roller such as a gravure roller or a relief roller can be used. Since a surface of the application roller 3 is a metal surface, the peelability is enhanced, and the transfer of the acrylic hot-melt M from the application roller 3 to the release sheet T is smooth. When the release sheet T is passed between the application roller 3 to which the acrylic hot-melt M transferred from the hot-melt supply roller 2 is adhered and the backup roller 4, the acrylic hot-melt M can be applied to the one surface of the release sheet T to form the adhesive layer N. The adhesive layer N may be in the form of characters, patterns, or the like. The metal roller 7 to be brought into contact with the surface of the release sheet T opposite to the surface on which the adhesive layer N is formed is made of a metal having high thermal conductivity such as copper, brass, aluminum, iron, and stainless steel. A heat capacity can be set by appropriately selecting a material and an external size. A contact area between the metal roller 7 and the release sheet T can be set according to a diameter of the metal roller 7, a position of the metal roller 7 with respect to a path of the release sheet T, and the like. The metal roller 7 may be provided with an appropriate heat dissipation mechanism or cooling mechanism. The metal roller 7 can also have a function of a tensor that applies tension to a release sheet.

Next, a method for manufacturing the filter structure F using the manufacturing device Q will be described. Referring to FIG. 3, by rotating the hot-melt supply roller 2, the acrylic hot-melt M in a molten state stored above the abutting portion between the hot-melt supply roller 2 and the auxiliary roller 1 is transferred to the surface of the application roller 3 in contact with the hot-melt supply roller 2. Then, by passing the release sheet T supplied from the supply unit between the application roller 3 and the backup roller 4, the acrylic hot-melt M is applied to the one surface of the release sheet T in a predetermined pattern, and the adhesive layer N having a predetermined pattern is formed on the release sheet T. Next, the release sheet T on which the adhesive layer N is formed is conveyed to the position of the metal roller 7, and the surface of the release sheet T on which the adhesive layer N is not formed is engaged with the metal roller 7. The metal roller 7 has a temperature lower than a temperature of the adhesive layer N, and has excellent thermal conductivity and a sufficient heat capacity. Therefore, since the adhesive layer N in a softened state on the release sheet T is cooled by the metal roller 7 via the release sheet T, a region of the adhesive layer N in the vicinity of the release sheet T becomes an increased hardness region in which the hardness is increased due to a temperature decrease. On the other hand, a front surface side region of the adhesive layer N away from the release sheet T is maintained in a softened state region having fluidity. Since the contact between the release sheet T and the metal roller 7 is in a substantially uniform state at any portion, the temperature decrease of the adhesive layer N caused by the contact is performed substantially uniformly, the hardness of the adhesive layer N is continuously changed from the region in the vicinity of the release sheet T to the front surface side region, and this change state is substantially uniform along a longitudinal direction of the adhesive layer N. The hardness change state of the adhesive layer N can be easily controlled by adjusting the temperature, the thermal conductivity, the heat capacity, the contact area with the release sheet T, a contact time, and the like of the metal roller 7. Therefore, by controlling the hardness change state, it is possible to adjust a rate of the adhesive layer N entering the filter layer S and a thickness of the adhesive layer N located on a front surface side of the filter layer S in the steps described later.

In this way, the release sheet T in which the hardness of the adhesive layer N is adjusted is conveyed to the position of the nip rollers 5 and 6. Meanwhile, the filter layer S is also conveyed to the position of the nip rollers 5 and 6 by the supply rollers 10 and 11 and the conveying rollers 12, 13, and 14. At this time, the conveying speeds of the filter layer S and the release sheet T are controlled so as to coincide with each other at the position of the nip rollers 5 and 6. The filter layer S and the release sheet T supplied to the nip rollers 5 and 6 are passed between the nip rollers 5 and 6 in a state where the filter layer S faces the surface of the release sheet T on which the adhesive layer N is formed. Thus, the adhesive layer N on the release sheet T is pressed against the filter layer S, and the filter structure F in which the adhesive layer N and the filter layer S are integrated is manufactured.

In the filter structure F of the present example, the acrylic hot-melt M may be partially applied by pattern coating instead of forming the adhesive layer N on the entire surface of the filter layer S. An application amount of the acrylic hot-melt M is preferably 20 $g/m^2$ to 50 $g/m^2$, and more preferably 25 $g/m^2$ to 35 $g/m^2$. The application rate of the adhesive layer N to the filter layer S is preferably in a range of 5% to 95%, more preferably in a range of 30% to 90%, and still more preferably in a range of 40% to 80%. By setting the application amount and the application rate to the above ranges, mounting reliability with respect to a target portion can be ensured. The above numerical values can be appropriately changed according to the use and size of the filter structure F.

The filter structure of the invention can be widely used as an air filter product in, for example, household appliances such as a kitchen range hood, an air conditioner and a ventilation fan, vents installed indoors and outdoors, and at ventilation locations in industrial equipment. In this case, as shown in FIG. 1, the adhesive layer N formed of the acrylic hot-melt M may be used to indicate characters L or the like indicating a replacement time of the filter. As a result of the filter layer S being colored by capturing dust in the air at portions other than the characters L or the like, the colorless characters L or the like that could hardly be identified before use becomes outline characters and can be clearly read as the surroundings are colored with the lapse of the usage time. Therefore, by setting the content indicated by the characters L or the like to indicate the filter replacement time, the filter replacement time can be displayed to a user.

An electrostatic filter having a function of effectively removing ultrafine particles by electrostatic force can also be used as the filter layer. As the electrostatic filter, for example, an electrostatic filter that is charged by subjecting a polypropylene non-woven fabric to corona discharge treatment or the like, an electrostatic filter that is made by subjecting a non-woven fabric containing a wool fiber to resin processing and then charging the non-woven fabric in a tanning step, and an electrostatic filter in which a surface of a core-sheath type composite fiber having a surface of a polypropylene resin coated with a polyethylene resin is polarization-charged by generating a DC high electric field using an application electrode on the core-sheath type composite fiber are known. By using an electrostatic filter as the filter layer, it is possible to remove ultrafine particles called PM2.5 having a particle diameter of 2.5 μm or less.

In the case in which the filter layer is an electrostatic filter, a decrease in a collection efficiency with respect to PM2.5, which occurs when a solvent-based adhesive is used for the adhesive layer in the related art, can be prevented when an acrylic hot-melt is used, and thus the invention has an advantage that a filter structure having an excellent collection effect with respect to PM2.5 can be provided.

The filter structure of the invention can be applied to an object selected from those having a surface subjected to plating such as aluminum-zinc alloy plating or coating such as polyester coating. In particular, a generally used range hood is often made from a steel plate with various types plating or polyester coating on a surface thereof, and by applying the filter structure of the invention to an object subjected to plating or coating as described above, the generation of adhesive residue when removing the filter structure can be further prevented.

The filter structure of the invention can be a relatively large product in which at least one length of the filter layer is, for example, 25 cm or more. When the filter structure is a larger product, such that at least one length of the filter layer is 30 cm or more, and further 35 cm or more, the filter structure is more likely to separate from an object or partially peel off from the object due to its own weight. In particular, when the filter structure is used in a range hood, an air conditioner, an air purifier, or the like, the size of the filter structure to be used varies depending on each model, but is commonly a large size such that at least one length thereof is several tens of centimeters or more. Therefore, when the invention is applied to such a large filter structure, an advantage becomes more apparent that the filter structure does not separate from an object when the filter structure is adhered to the object under either temperature condition of 25° C. or 5° C.

Examples

It was verified by a test that according to the filter structure of the invention, it is possible to appropriately attach the filter structure to an object to be adhered without separating from the object under either temperature condition of 25° C. or 5° C., and it is possible to obtain an effect that adhesive residue is not generated even when the filter structure is peeled off from the adhered object after being attached for a long time.

A filter structure prepared on the assumption of being used in a metal filter of a range hood, in which an adhesive layer was formed by a hot-melt on one surface of a filter layer made of a non-woven fabric, was used as a sample. As the range hood used in the test, model number "BDR-3HL-601BK" manufactured by Fuji Industrial Co., Ltd was used.

Four types of tests were performed: 1) maximum peeling loads at 25° C. and 5° C., 2) attachability of the filter structure to the metal filter, 3) whether the filter structure separated from the metal filter, and 4) presence or absence of adhesive residue on the metal filter.

1) Maximum Peeling Load at 25° C. and 5° C.

The "maximum peeling load" was measured according to "JIS Z 0237:2009" as a basic measurement method, and was measured under the measurement conditions described below. The test was performed under two temperature environment conditions of 25° C. and 5° C. As the "maximum peeling load", a maximum load when the sample was adhered to an object and then peeled from the object was measured. A constant-speed elongation testing machine was used as a testing machine, and a filter structure having a width of 5 mm and a length of 250 mm and a filter structure having a width of 10 mm and a length of 250 mm (the adhesive layers have the same sizes) were prepared as samples. A stainless steel plate of SUS304 was used as a target surface to be adhered. The test was performed by a method of adhering the sample to the target surface, press-bonding the surface of the sample for two reciprocation with a roller of 1 kg, and then measuring the maximum load when the sample is peeled off at a peeling speed of 100 mm/min in a direction of 180°.

2) Attachability of Filter Structure to Metal Filter

The metal filter was removed from the range hood, and the metal filter was placed on a horizontal table. A filter structure having the same size as the metal filter was prepared, and the filter structure was attached such that a surface on which an adhesive layer was formed was adhered to a surface of the metal filter. In the attachment, when a filter structure having a predetermined size was placed on the surface of the metal filter, a surface of the filter structure on which no adhesive layer is formed was pressure-bonded for one reciprocation with a roller at a pressure of 2 kg/cm². Immediately after that, a state when the metal filter was raised vertically was evaluated by visual observation. That is, as a result of the observation, a state in which the attachment of the metal filter to the filter structure was maintained when the metal filter was raised vertically was evaluated as "○", a state in which peeling occurred in at least a part of the filter structure was evaluated as "Δ", and a state in which the entire filter structure peeled off and the attachment to the metal filter could not be maintained was evaluated as "x". The test was performed under two temperature environment conditions of 25° C. and 5° C.

3) Whether Filter Structure Separated from Metal Filter

The metal filter to which the filter structure was attached was attached to a range hood according to the procedure of the test of "2) Attachability of Filter Structure to Metal Filter" described above, and whether the filter structure separated from the metal filter after 10 minutes from the attachment was evaluated by visual observation. That is, a case in which no separation of the filter structure from the metal filter was observed was evaluated as "○", a case in which a part of the filter structure peeled off from the metal filter but the filter structure did not separate from the metal filter was evaluated as "Δ", and a case in which the filter structure separated from the metal filter was evaluated as "x". The test was performed under two temperature environment conditions of 25° C. and 5° C.

4) Presence or Absence of Adhesive Residue on Metal Filter

In the test at 25° C. in "3) Presence or Absence of Separation of Filter Structure from Metal Filter" described above, after maintaining the attached state for one month in the temperature environment of 25° C., the filter structure was peeled off from the metal filter, and the presence or absence of adhesive residue of the adhesive on the surface of the metal filter was evaluated by visual observation. That is, a case in which no adhesive residue was observed on the surface of the metal filter was evaluated as "○", and a case in which adhesive residue was observed on a part of the surface of the metal filter was evaluated as "x".

Test results are shown in Table 1 below.

TABLE 1

| | Adhesive layer | Application amount (g/m²) | Basis weight of filter layer (g) | Material of filter layer | Maximum peeling load (N) | | | | Maximum peeling load per unit (N/mm) | | | |
|---|---|---|---|---|---|---|---|---|---|---|---|---|
| | | | | | 25° C. | | 5° C. | | 25° C. ($K_1$) | | 5° C. ($K_2$) | |
| | | | | | Width: 5 mm | Width: 10 mm | Width: 5 mm | Width: 10 mm | Width: 5 mm | Width: 10 mm | Width: 5 mm | Width: 10 mm |
| Example 1 | Hot-melt (acrylic) | 35 | 50 | PET | 0.54 | 0.99 | 0.14 | 0.33 | 0.108 | 0.099 | 0.028 | 0.033 |

TABLE 1-continued

| Example | Adhesive | | | | | | | | | | | |
|---|---|---|---|---|---|---|---|---|---|---|---|---|
| Example 2 | Hot-melt (acrylic) | 35 | 50 | PET | 0.09 | 0.20 | 0.05 | 0.11 | 0.018 | 0.02 | 0.01 | 0.011 |
| Example 3 | Hot-melt (acrylic) | 35 | 50 | PET | 0.80 | 1.55 | 0.15 | 0.32 | 0.16 | 0.155 | 0.03 | 0.032 |
| Comparative Example 1 | Hot-melt (acrylic) | 35 | 50 | PET | 0.51 | 0.79 | 0.01 | 0.02 | 0.102 | 0.079 | 0.002 | 0.002 |
| Comparative Example 2 | Hot-melt (acrylic) | 35 | 50 | PET | 5.00 | 9.50 | 0.40 | 0.80 | 1.00 | 0.95 | 0.08 | 0.08 |

| | Ratio $K_1/K_2$ of maximum peeling load (25° C./5° C.) | | Attachability | | Presence or absence of separation | | Adhesive residue on metal filter |
|---|---|---|---|---|---|---|---|
| | Width: 5 mm | Width: 10 mm | 25° C. | 5° C. | 25° C. | 5° C. | 25° C. |
| Example 1 | 3.86 | 3.00 | ○ | ○ | ○ | ○ | ○ |
| Example 2 | 1.80 | 1.82 | ○ | ○ | ○ | ○ | ○ |
| Example 3 | 5.33 | 4.84 | ○ | ○ | ○ | ○ | ○ |
| Comparative Example 1 | 51.00 | 39.50 | ○ | x | ○ | x | ○ |
| Comparative Example 2 | 12.50 | 11.88 | ○ | ○ | ○ | ○ | x |

From the results in Table 1, it can be seen that the filter structures according to Examples 1 to 3 in which the adhesive layer is formed of an acrylic hot-melt adhesive and the ratio $K_1/K_2$ of the maximum peeling load $K_1$ at 25° C. to the maximum peeling load $K_2$ at 5° C. [=maximum peeling load N/mm (25° C.)÷maximum peeling load N/mm (5° C.)] is in a range of 1 to 6 are excellent in the attachability to the metal filter under either temperature condition of 25° C. or 5° C., and have no separation of the filter structure from the metal filter or adhesive residue on the metal filter.

On the other hand, it can be seen that the filter structure according to Comparative Example 1 in which the adhesive layer is formed of an acrylic hot-melt adhesive and the ratio $K_1/K_2$ [=maximum peeling load N/mm (25° C.)÷maximum peeling load N/mm (5° C.)] of the maximum peeling load $K_1$ at 25° C. to the maximum peeling load $K_2$ at 5° C. is out of the range of 1 to 6 is inferior in the attachability to the metal filter under the temperature condition of 5° C., and separation from the metal filter occurs. Similarly, it can be seen that although the filter structure according to Comparative Example 2 has no problem in the attachability to the metal filter and separation of the filter structure from the metal filter, since not only $K_1/K_2$ deviates from the range of 1 to 6, but also the maximum peeling load $K_1$ at 25° C. greatly exceeds 0.18 N/mm, adhesive residue occurs on the metal filter.

INDUSTRIAL APPLICABILITY

The filter structure according to the invention can be applied to, for example, household appliances such as a kitchen range hood, an air conditioner and a ventilation fan, vents installed indoors and outdoors, and also an air filter product for ventilation locations in industrial equipment. In particular, the filter structure is suitable for an air filter for a relatively large product such as a range hood or an air conditioner. In addition, the invention can be applied to an air filter configured to indicate a replacement time by an adhesive layer, or an electrostatic filter in which a filter layer is charged.

The invention claimed is:

1. A filter structure (F) configured to filter passing gas by being adhered to an object, the filter structure comprising:
    a filter layer(S) including a sheet-shaped member having air permeability; and
    an adhesive layer (N) that is formed on at least a part of one surface of the filter layer and is configured to be adhered to the object, wherein
    the adhesive layer is formed of an acrylic hot-melt adhesive (M), has a ratio $K_1/K_2$ of a maximum peeling load $K_1$ 25° C. to a maximum peeling load $K_2$ at 5° C. when adhered to the object in a range of 1 to 6, and the filter structure does not separate from the object when adhered to the object under a temperature condition of 25° C. or 5° C.

2. The filter structure according to claim 1, wherein the adhesive layer has a maximum peeling load $K_1$ at 25° C. in a range of 0.01 N/mm or more and 0.18 N/mm or less and a maximum peeling load $K_2$ at 5° C. in a range of 0.01 N/mm or more and 0.05 N/mm or less.

3. The filter structure according to claim 1, wherein a surface of the object is plated with a metal or painted with a resin.

4. The filter structure according to claim 1, wherein an application rate of the adhesive forming the adhesive layer on the one surface of the filter layer is 5% to 95%.

5. The filter structure according to claim 1, wherein at least one length of the filter layer is 25 cm or more.

\* \* \* \* \*